March 18, 1941.   P. RAMSEIER   2,235,236
FISHING TACKLE FLOAT
Filed Nov. 7, 1938
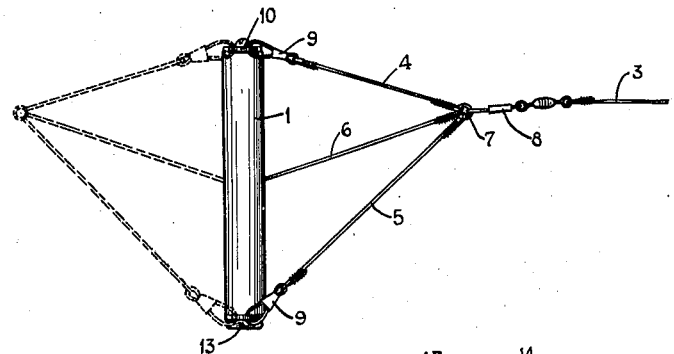
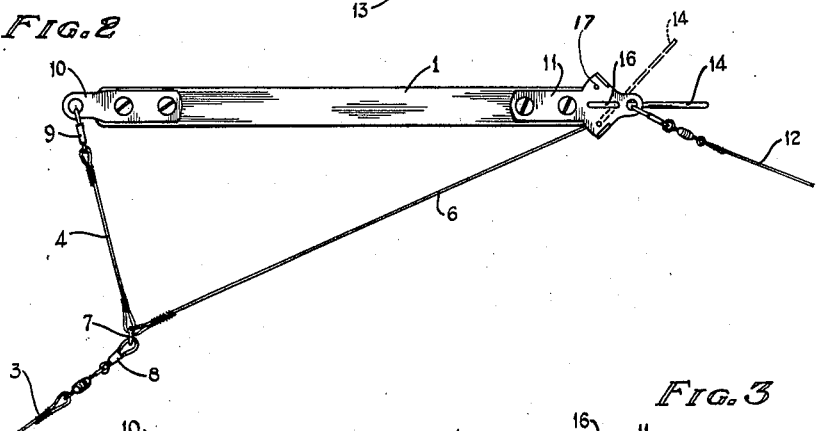
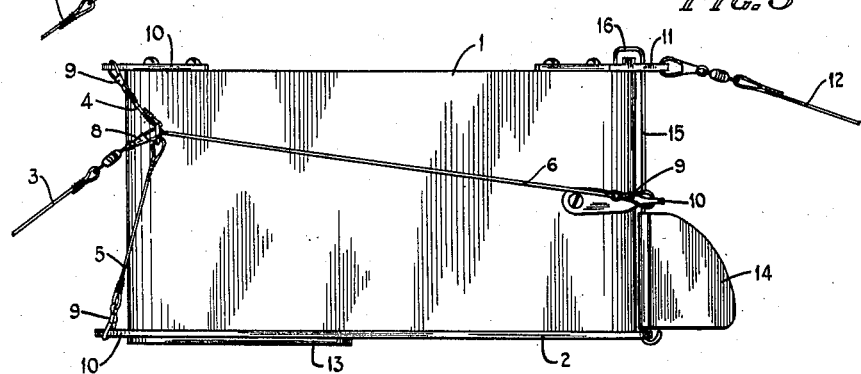
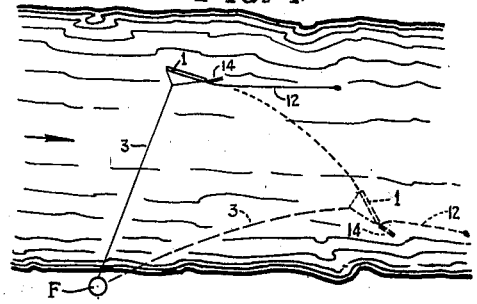
PAUL RAMSEIER
— INVENTOR
by Arthur J. Robert
— ATTORNEY Patented Mar. 18, 1941

2,235,236

UNITED STATES PATENT OFFICE 2,235,236

FISHING TACKLE FLOAT

Paul Ramseier, Louisville, Ky.

Application November 7, 1938, Serial No. 239,221

3 Claims. (Cl. 43—49)

This invention relates to fishing-tackle floats of what may be termed the "kite" type since they are constructed to be acted upon by water currents in much the same manner as a kite is acted upon by air currents. In floats of this type, an effective utilization of the kite principle is sought to enable a fisherman to maneuver the float, by tensioning, slackening and reeling the hand line, up and down stream, toward and from and at varying distances along, an imaginary line running obliquely across the stream from the fisherman and also to cause the float to assume and maintain its oblique position relatively to the fisherman when the latter travels along the stream. In fishing with a rod and reel for example, an effective float of this character renders it possible to still fish or troll obliquely across the stream from any point or line of movement in the stream or along its banks.

The principal object of this invention is to provide a float which makes an effective utilization of the kite principle possible.

Other objects of the invention are: to provide a float which is simply, sturdily and inexpensively constructed in a compact form of light weight, which can be easily and quickly attached to and detached from the hand line, and which is highly sensitive, that is to say, quickly responsive to the maneuvering manipulations of the hand line; and to provide one that can be easily, quickly and completely reversed so as to condition it for operation in a different area or in the opposite direction of movement.

The invention is illustrated in the accompanying drawing, wherein:

Figure 1 is a front end elevation of a device constructed in accordance with the invention, the sling being shown in full lines in one position, and in dotted lines in the reverse position;

Figure 2 is a top plan view thereof with a fishing line trailing from the device;

Figure 3 is a side elevation thereof; and

Figure 4 is a view showing relative positions assumed by the device in water.

As illustrated, the float comprises a rectangular platelike planar member or keel 1 preferably composed of a light buoyant material such as wood. The bottom of the keel is weighted in any suitable manner, as by the metal strip 2, to cause it to assume a vertical position in the water and to submerge it to a suitable extent. The weight and buoyancy of the keel, as a whole, should be such as to cause it to project from the water to the slightest extent necessary to make it easily observed. For example, I have obtained good results using a wooden keel 5½" long, 2¾" high and ⅜" thick, and have found it easy to follow when projecting approximately ⅜" above the water.

The keel is connected along its periphery to a hand line 3 by a polyhedral sling composed of front, upper and lower lines 4 and 5 and a rear line 6. The front, upper and lower lines 4 and 5 extend from the common hand-line connecting point of the keel respectively to the front, upper and lower, corners of the keel, while the rear line 6 extends from the common point to the approximate centers of the rear end of the keel. The lines of the sling preferably are connected at the common point to a metal eye 7 through which the sling may be quickly connected to or disconnected from a snap fastener 8 on the hand line. The keel ends of the lines of the sling carry snap fasteners 9 by which they may be quickly attached to or detached from suitable metal eye-forming members 10 permanently mounted on the keel.

The sling is forwardly slanted by making its rear line longer than either of its front lines. It is also upwardly slanted to a slight degree by making its lower line slightly longer than its upper line. The upper and rear lines cooperate to determine the oblique angle to which the keel will extend when in the stream, while both of these lines cooperate with the lower line to maintain the vertical position of the keel. The rear line 6 and either or both of the front lines of the sling are made long enough to form a loop through which the keel may be inverted without changing any of the sling connections to transfer the sling from its operative position over one face of the keel to a corresponding position over the opposite face thereof. For example, the rear line 6 and the front upper line 4 cooperate to form a loop (see Figure 2) through which the keel may be inverted by rotating it 180° around an axis passing through the connections of these lines to the keel. With an arrangement of this character, it is possible to reverse the keel, that is to say reverse the relation of the sling to the keel, easily and quickly without detaching or changing any of the connections between the hand line and keel.

The top rear corner of the keel is provided with a metal eye-forming member 11 to which a trolling line 12 may be connected. The drag of this line will normally tend to cause the rear end of the keel to extend more deeply into the water than the front end thereof but, if desired, this tendency may be counteracted by securing a counterweight 13 to the bottom of the keel, adjacent its front end.

While not essential, it is desirable, because of improved operation, to provide a rudder 14 at the rear end of the keel. The rudder shown is fixedly mounted on a vertical shaft 15 having, at its upper end, a crank 16 by which it may be manually rotated to turn the rudder from a central position in the major plane of the keel through a range of positions on either side thereof. The rudder preferably is held in its central and at least two offset positions by causing the free end of the crank 16 to extend into recesses 17 appropriately formed in the trolling eye member 11.

While a float of this character may be used to troll or to still fish from opposite banks of the stream or from the stream itself, an explanation of its operation will be facilitated by assuming a particular condition of use. It is assumed, therefore, that a fisherman is standing at F (see Figure 4) on a bank of a stream flowing from the fisherman's left to his right. The float is attached to the hand line and placed in the water with its rear or rudder end down stream and with the sling extending over the face of the float nearest the fisherman. If desired, the rudder may be turned to point downstream in a direction away from the fisherman. As the hand line is reeled out, the float will float downstream, as indicated in dotted lines in Figure 4. When the hand line is tensioned, the float will assume an oblique position in the water in which the sling faces the fisherman. The reaction of the water flowing against the sling face will cause the float to travel obliquely upstream away from the bank until it reaches an imaginary line running obliquely downstream from the fisherman. The float may be permitted to remain in the position which it assumes along this line or, by slackening and tensioning the line, maneuvered downstream and upstream away from and toward the line. It may be caused to move along the line by reeling or unreeling the hand line. Should the fisherman move upstream along the bank, the float will likewise move, maintaining its oblique position relatively to the fisherman. The fisherman thus may not only still fish or troll within a limited area of the stream from one point on the bank of the stream, but also troll upstream, while moving along the bank.

The fisherman may also troll downstream without disturbing the relative position of the float provided he moves at a rate less than that of the stream. If the fisherman moves at a rate greater than that of the stream, the float will necessarily assume a position obliquely upstream relatively to the fisherman. This change in the relative position of the float requires that the float be completely reversed relatively to the sling. The complete reversal of this float can be readily accomplished simply by reeling in the float and inverting the keel through a loop in the sling. When inverted, it can be returned to the water and operated as before while trolling downstream.

When fishing from a boat in the stream, it will be readily appreciated that the float, when conditioned for trolling upstream along one bank, is also conditioned for trolling downstream along the opposite bank. However, when it is desired to reverse the direction of trolling along the same bank, or when it is desired to transfer the float from one side of the boat to the other, either while stationary or while moving in the same direction, it will be necessary to reverse the keel. The ease with which the float may be reversed is advantageous. Among its other advantages are: it can be carried about, placed in use and operated with the minimum of trouble; it is small, yet easily observed in operation; it is efficient since the major portion of its sling face is subject to action of the water, a condition which promotes maneuverability.

While the invention has been explained in connection with its use as a fishing float, it will be understood that it may be readily applied to other uses such, for example, a keel for a toy boat or like body to enable the boat to be maneuvered in a body of water by a person standing on the shore. When applied to a longitudinal buoyant body, such as a boat, the keel will extend in the major vertical plane of the body while the sling will be attached to the periphery of the body, boat and keel, as a whole. The sling should also be made long enough to permit its reversal relatively to the body to be accomplished without detaching any of the sling lines.

Having described my invention, I claim:

1. A kite type float of the class described comprising: a longitudinal buoyant body presenting, in its longitudinal vertical plane, a planar keel; and a polyhedral sling having at least three lines connected to the periphery of said body at spaced points substantially within said plane, at least two lines of the sling being long enough to form a loop through which the body may be inverted to reverse the relative positions of the sling and body without necessarily detaching any of the sling lines from the body.

2. A kite type float of the class described comprising: a buoyant planar keel; and a polyhedral sling having at least three lines connected to the periphery of said keel, at least two lines of the sling being long enough to form a loop through which the keel may be inverted to reverse the relative positions of the keel and sling without necessarily detaching the lines of the sling.

3. A kite type float of the class described comprising: a buoyant planar keel; means weighting said keel to cause it to assume a vertical and substantially but not completely submerged position in water; a polyhedral sling having at least three lines connected to the periphery of said keel, at least two of said lines being long enough to form a loop through which the keel may be inverted to reverse the relative positions of the sling and the keel; means on the keel to which a trailing fishing line may be attached; and a rudder mounted on the rear end of the keel for lateral angular movement from a position substantially within the plane of the keel to positions on either side thereof.

PAUL RAMSEIER.